May 24, 1949.  W. M. TWAY  2,471,051
WHEEL AND TIRE DOLLY
Filed Feb. 1, 1946
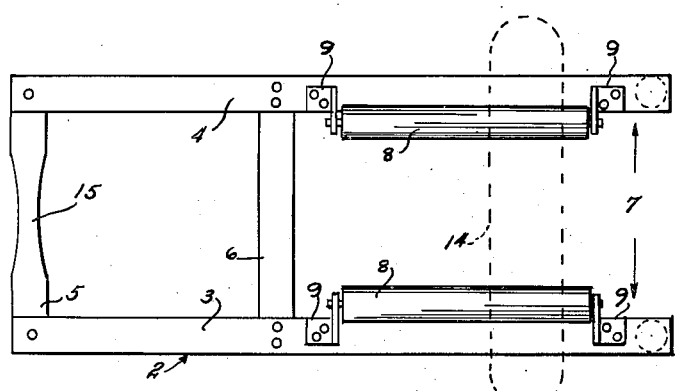
FIG. 1.
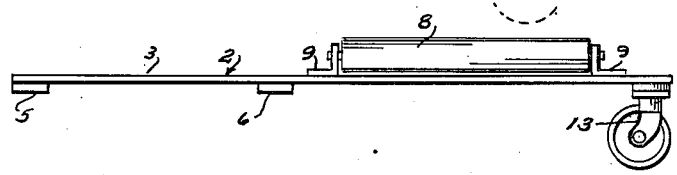
FIG. 2.
FIG. 4.
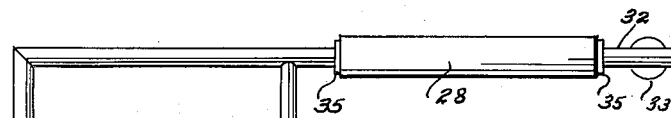
FIG. 5.
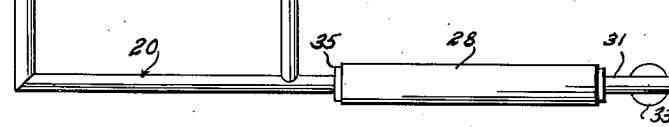
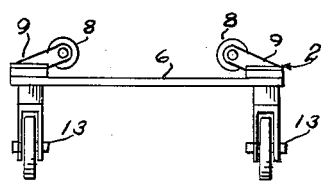
FIG. 3.
INVENTOR.
Walter M. Tway
BY
Scott L. Norvell Patented May 24, 1949

2,471,051

UNITED STATES PATENT OFFICE 2,471,051

WHEEL AND TIRE DOLLY

Walter M. Tway, Maricopa County, Ariz.

Application February 1, 1946, Serial No. 644,882

2 Claims. (Cl. 280—53)

This invention pertains to dolly for handling, moving and attaching automobile car tires and wheels. One of the objects of the invention is to provide a simple light, easily handled wheeled device which can be used to carry an automobile wheel of the passenger car type to a position adjacent the wheel hub, and will then support it so that it can be rotated axially to aline the attaching holes in the wheel with the hub studs;

A further object is to provide an automobile wheel carrier having a frame supported on caster wheels at one end, a handle at the other end, and parallel spaced rollers operative above said wheels extending along the wheeled end of the frame a distance sufficient to support an automobile wheel either in a horizontal position or in an erect position with the periphery of the tire resting on the rollers; the parts being arranged so that the frame functions as a lever with the wheels acting as a fulcrum and the force being applied upward at the handle end while the automobile wheel resting on the rollers constitutes the load;

A further object is to provide a light weight dolly having a frame with a general U-shape, provided with caster wheels at the outer ends of the arms of the frame and rollers for supporting an automobile tire operative on the arms and positioned just back of said casters. Other objects will appear hereinafter.

I attain the foregoing objects by means of the devices and mechanism illustrated in the accompanying drawings in which—

Figure 1 is a plan view of one form of my device; Figure 2, a side view thereof; and Figure 3, an end elevation; Figure 4 is a plan view of a slightly modified form of the device and; Figure 5 a side view thereof.

Referring to the drawings and particularly to Figures 1, 2 and 3, numeral 2 indicates the frame of my dolly which, in this instance is made of rectangular hardwood members having a rectangular cross section and secured together by rivets at the several joints.

The frame 2 is composed of parallel longitudinal members 3 and 4 connected at the outer or handle end by transverse members 5 and 6. This provides a frame having a substantially U-shaped plan. The inner end portions of members 5 and 6 constitute the arms of the U and enclose an area 7. Along the top faces of the inner or arm portions of frame members 3 and 4 are rollers 8 supported by bearing pins on brackets 9. These rollers may be made of wood, or light metal tubes, and extend substantially from member 6 to the inner ends of the longitudinal members.

Casters 13 are attached to the under side of the outer ends of members 3 and 4. The transverse member 5 at the opposite end of the frame is smoothly rounded to form a handle 15.

In use a tire and wheel indicated by the dotted outline 14 may be placed on the dolly and elevated to a vertical position resting on the rollers 8. One hand can be used to grasp and steady the top of this tire and the other hand to grasp the frame handle 15. The tire and dolly may then be trundled to a position adjacent the hub on which the tire and wheel is to be mounted. It is assumed that the automobile wheel hub is jacked up to a proper position to receive the tire and wheel to be mounted. The dolly will then roll under the automobile wheel hub with the axis of the wheel to be mounted substantially alined with the hub axle. As the wheel approaches the hub its height may be varied by raising or lowering the frame 2 by use of handle 15. Then, as the wheel slips onto the hub it may be rotated on rollers 8 until the receiving holes in the wheel register with the mounting bolts on the hub. In this way mounting of a tire is greatly facilitated. The weight of the tire is levered into position by the frame of the dolly as above described using the casters 13 as fulcrums. It is therefore unnecessary for the operator to lift the tire by hand as is the present custom. He need only balance the wheel or tire on the supporting roller and rotate it to the proper position relative to the wheel hub.

Referring to the form of my device shown in Figures 4 and 5 the frame 20 is made of light metal tubing. The two longitudinal members 31 and 32 are tied together at the left or inner end by transverse members 25 and 26. Member 25 becomes the operating handle equivalent to the handle 15 in the form first shown. Rollers 28 are mounted directly on the outer ends of the longitudinal frame members 31 and 32. Flanges 35 are welded to these members to hold the rollers in position. These rollers are made of a length of tubing provided with end flanges drilled to act as bearings to turn on the longitudinal frame members. At the outer ends of these frame members and on the under side thereof the casters 33 are attached, as shown particularly in Figures 4 and 5. The operation of this form of device is the same as that of the first form above described. The materials used however make it possible to mount the rollers directly on the longitudinal frame members and obviate the necessity of brackets 9.

Having now described my invention and its use

I realize that a number of modifications may be made to the forms herewith shown all of which may nevertheless remain within the spirit and intention of the invention therefore I shall be limited only by the following claims.

I claim:

1. A dolly for mounting automobile wheels and tires on wheel hubs comprising in combination, a U-shaped frame having tubular parallel side members arranged and secured in spaced relation by a transverse tubular member at one end providing a handle, a second parallel transverse member positioned toward the open end acting as a brace and leaving a substantial length of said side members as arms of said U-shaped frame, casters attached to and depending from the outer ends of said arms, and tubular rollers substantially co-extensive with said frame arms, coaxially disposed relative to said arms and journalled thereon.

2. A dolly for mounting automobile wheels on wheel hubs, comprising in combination, a U-shaped frame composed of cylindrical tubular longitudinal side members joined in spaced relation by a tubular transverse end member at their inner ends, and braced by an intermediately positioned transverse tubular member, said transverse end member being adapted to act as an operating handle, and with portions of said side members extending beyond said transverse bracing member to receive and journal tire supporting rollers; tubular tire supporting rollers journalled on the outer end portions of said longitudinal side frame members in concentric relation therewith; and casters attached to the outer ends of said longitudinal frame members and disposed in depending relation to the breadth of said frame.

WALTER M. TWAY.

REFERENCES CITED

The following references are of record in the file of this patent:

UNITED STATES PATENTS

| Number | Name | Date |
|---|---|---|
| 1,985,362 | Clyde | Dec. 25, 1934 |
| 2,027,265 | Black | Jan. 7, 1936 |
| 2,170,607 | Green | Aug. 22, 1939 |
| 2,217,898 | Gemmill | Oct. 15, 1940 |
| 2,332,443 | Foringer | Oct. 19, 1943 |
| 2,345,458 | Caron | Mar. 28, 1944 |
| 2,380,415 | Carruthers | July 31, 1945 |
| 2,386,516 | Thompson | Oct. 9, 1945 |

FOREIGN PATENTS

| Number | Country | Date |
|---|---|---|
| 38,382 | France | May 30, 1931 |